United States Patent [19]
Kay

[11] Patent Number: 5,406,541
[45] Date of Patent: Apr. 11, 1995

[54] APPARATUS AND METHOD FOR A DUAL HALF-APERTURE FOCUS SENSOR SYSTEM

[75] Inventor: David B. Kay, Rochester, N.Y.

[73] Assignee: Eastman Kodak Company, Rochester, N.Y.

[21] Appl. No.: 998,179

[22] Filed: Dec. 29, 1992

[51] Int. Cl.$^6$ .................................................. G11B 7/00
[52] U.S. Cl. .................................... 369/120; 369/44.23
[58] Field of Search ................ 369/120, 112, 44.23, 369/44.41, 44.42; 250/201.5

[56] References Cited

U.S. PATENT DOCUMENTS

| | | | |
|---|---|---|---|
| 3,876,841 | 4/1975 | Kramer et al. | 179/100.3 |
| 4,079,248 | 3/1978 | Lehureau et al. | 250/201 |
| 4,165,519 | 8/1979 | Goto | 358/128 |
| 4,517,666 | 5/1985 | Ando | 369/45 |
| 4,521,680 | 6/1985 | Ando | 250/201 |
| 4,546,460 | 10/1985 | Ando | 369/45 |
| 4,665,310 | 5/1987 | Heemskerk | 250/201 |
| 4,672,188 | 6/1987 | Cohen | 250/201 |
| 4,712,205 | 12/1987 | Smid et al. | 250/201.5 |
| 5,132,959 | 7/1992 | Ishika | 369/112 |
| 5,153,864 | 10/1992 | Ishika | 369/44.23 |
| 5,161,139 | 11/1992 | Inoue et al. | 369/112 |

FOREIGN PATENT DOCUMENTS

0177108A1  4/1986  European Pat. Off. .

Primary Examiner—Paul M. Dzierzynski
Assistant Examiner—Kiet T. Nguyen
Attorney, Agent, or Firm—Raymond L. Owens

[57] ABSTRACT

In an optical information storage an retrieval system, the tracking and focus signals have, in the past, been generated by directing radiation beams from each section of a dual half aperture prism to spatially separated dual element sensors and processing the signals from the pair of dual element sensors. In order to reduce cross-talk between the focusing and tracking signals, a radiation beam which has interacted with the optical storage medium is divided into two portions. The first portion of the radiation beam is directed to a dual prism and the radiation beam from each portion of the prism is applied to a different dual sensor. However, the dual half aperture prism divides the radiation beam which has interacted with the storage medium along a plane perpendicular to the projection of the optical storage medium track being monitored. The focusing signal is derived from this pair of dual element sensors. The second portion of the radiation beam which has interacted with the optical storage medium is applied to a third dual element sensor, the third dual element sensor being divided to receive radiation defined by a plane parallel to the track on the optical storage medium being monitored. The third dual element sensor generates the tracking signal. This technique for generating the tracking and the focusing signals reduces the cross-talk between the two signals.

20 Claims, 4 Drawing Sheets

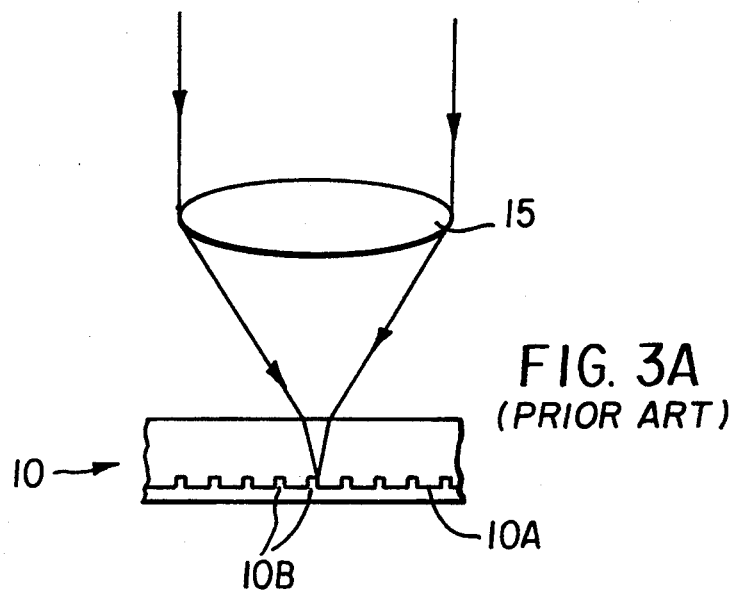
FIG. 3A
*(PRIOR ART)*
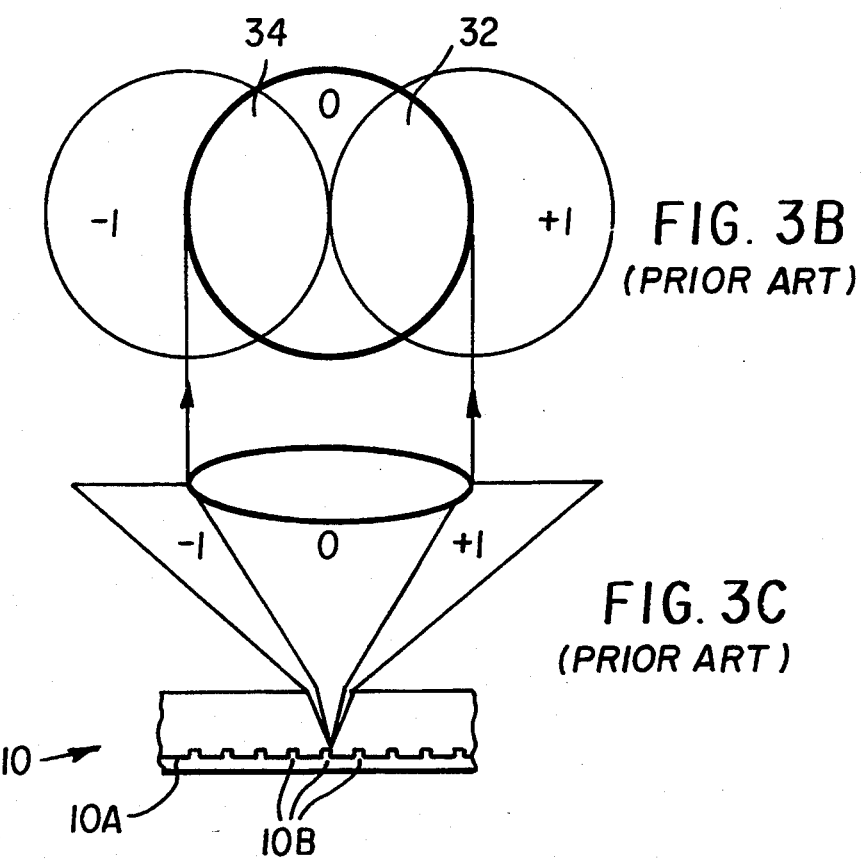
FIG. 3B
*(PRIOR ART)*
FIG. 3C
*(PRIOR ART)*

APPARATUS AND METHOD FOR A DUAL HALF-APERTURE FOCUS SENSOR SYSTEM

BACKGROUND OF THE INVENTION

1. Field of Invention

This invention relates generally to the read/write heads used in optical information storage and retrieval systems and, more particularly, to the apparatus used in conjunction with the read/write heads for providing the tracking signals and the focusing signals used in the positioning of the read/write head relative to the storage medium.

2. Description of the Related Art

Referring to FIG. 1, one configuration for an optical information storage and retrieval system according to the related art is shown. A radiation source 11, typically a laser diode, provides a radiation beam which is collimated by collimating lens 12. The collimated radiation beam is transmitted through a polarization beam splitter 13 and applied to a quarter wave plate 14. The polarization beam splitter 13 provides linear polarization for the radiation beam and the quarter wave plate 14 provides a circular polarization to the radiation beam. The circularly polarized radiation beam from the quarter wave plate 14 is focused by objective lens 15 on the information storage surface 10A of the storage medium 10. The storage medium 10 is typically a disk with a surface which interacts with the circularly polarized radiation beam. The interaction with the storage medium surface 10A causes the radiation beam to be reflected and diffracted therefrom. The resulting radiation beam is collimated by objective lens 15 and the collimated resulting radiation beam is transmitted through the quarter wave plate 14. The quarter wave plate restores the linear polarization of the radiation beam. However, a component of the restored polarized radiation beam perpendicular to the polarization of the originally polarized beam will typically be present as a result of the second passage through the quarter wave plate 14. When the restored, polarized radiation beam is applied to the polarization beam splitter 13, the perpendicular component will be reflected by the beam splitter 13. The reflected radiation beam is applied to a sensor focusing lens 16 which converges the resulting radiation beam on sensor array 5. The resulting radiation beam has imposed thereon modulation that can be processed to provide the information (or data) which is stored on the storage medium. In addition, the resulting radiation beam can be processed in such a manner as to provide tracking and focusing signals which can be used to activate apparatus which controls the position of the focused radiation beam on the storage surface 10A (i.e., the tracking in one dimension) and which controls the distance of the objective lens 15 from the storage surface 10A, (i.e., the focusing of the radiation beam on the storage surface). In this type of optical information storage and retrieval system, the quarter wave plate imparts, to the radiation beam illuminating the storage surface 10A, a circular polarization. After reflection from the storage surface, the quarter wave plate restores a linear polarization. However, the linearly polarized radiation beam will have a component which is rotated by an angle of 90° from the plane of polarization originally established by the polarization beam splitter 13. The rotated component of the radiation resulting from interaction with the storage surface 10A is reflected by the beam splitter 13 and applied to sensor array 5.

Referring to FIG. 2, an example of the use of the processing of the radiation beam to provide tracking and focusing signals, according to the related art, is shown. This example is taken from European Patent Application 0,177,108 A1, issued in the name of A. Smid, P. F. Greve, and H. 't Lam, entitled "Opto-Electronic Focussing-Error Detection System, and filed on Feb. 10, 1985. In FIG. 2, the path of the resulting radiation beam, the resulting radiation beam being the radiation beam which has interacted with data track 21, is shown. (The quarter wave plate 14 and the beam splitter 13 have been omitted to emphasize certain important aspects of the configuration.) The data track 10A is the path on the storage surface 10A along which the radiation beam will move in accessing or storing the information encoded on the storage medium 10. A dual prism 25 is shown interposed between the objective lens 15 and the sensor focusing lens 16. The dual prism divides the resulting radiation beam into two components. The two radiation components include the radiation reflected and radiation diffracted from the storage medium. The first component is focused on dual sensor elements A and B of the sensor array 5, while the second radiation beam component is focused on dual sensor elements C and D. As will be known to those skilled in the art of processing resulting radiation beams, the data signal DS, the focusing signal FS, and the tracking signal TS are given respectively by:

$$DS = A + B + C + D \quad 1.)$$
$$FS = (A + D) - (B + C) \quad 2.)$$
$$TS = (A + B) - (C + D) \quad 3.)$$

where A, B, C, and D of the Equations 1–3 represent the voltages developed by the equivalently designated sensor element in response to radiation applied thereto. The data signal DS is the sum of voltages developed by all of the sensor elements. The focusing signal FS is the difference between the sum of the voltages resulting from the radiation applied to a pair of diagonal sensor elements, i.e., A and D, and the sum of the voltages resulting from the complementary diagonal pair of sensors, i.e., B and C. When the absolute value of the focusing signal FS is minimized, the radius of the radiation beam on the storage surface 10A will be minimized, i.e., the radiation beam will be focused on the storage surface 10A. The tracking signal TS is minimized when the radiation reflected and diffracted from above the center of the data track and the radiation reflected and diffracted from the below the center of the data track are equal. In order to understand the origin of the tracking signal, the role of the diffraction of the radiation beam must be understood.

Referring to FIG. 3A, the objective lens 15 is shown focusing the circularly polarized radiation beam on the storage surface 10A of storage medium 10. The storage surface 10A is shown as having a multiplicity of grooves, or equivalently, a multiplicity of data tracks 10B fabricated therein. The grooves 10B have dimensions relative to the wavelength of the radiation beam whereby diffraction patterns are formed. The data tracks 10B can be replaced with series of raised regions which are not connected, can be replaced with regions of appropriate dimension and refractive index, or any other structure which provides diffraction patterns in response to an impinging radiation beam without departing from the scope of the present invention. Referring to FIG. 3B, the resulting radiation beam after interaction with the storage surface is shown. The resulting radiation beam includes a zeroth order (reflected) component and a positive and a negative diffracted component. As will be clear, higher order diffraction components can be present, however, the present invention can be understood without further consideration of these components. The impinging radiation beam is shown as being off center and therefore closer to one edge of the data track or groove which is currently being tracked. This asymmetric positioning causes a wavefront phase shift in the diffracted orders and, consequently, an asymmetric interference between each of the diffracted components and the undiffracted (i.e., reflected or zeroth order radiation component). As a consequence, constructive interference occurs in one region, e.g., the region of overlap between the reflected radiation component and the +diffracted radiation component, while destructive interference occurs between the reflected radiation component and the −1 diffracted component. The magnitude of the resulting signal depends on the amount of shift of the impinging beam relative to the center of the data track or groove. In FIG. 3C, the difference between the intensities of the regions of interference is illustrated by region 32 (wherein the undiffracted radiation component and the +1 first order interference component interfere) and region 34 (wherein the undiffracted radiation beam component and the −1 first order diffracted radiation beam interfere). The polarity depends on whether the tracking of the radiation beam occurs for the data tracks (or grooves) or for the lands, i.e., the regions between the data tracks or grooves. Note that in the preferred embodiment, the two first order diffraction components are contiguous with the optic axis of the radiation beam. As a consequence, the two first order diffraction components will be superimposed on and will interfere with the reflected radiation beam. Referring once again to FIG. 2, the projection of the first order diffraction patterns 29A and 29B are shown on objective lens 15 and on dual prism 25. The difference in intensities of the resulting radiation components separated by dual prism 25 is determined by the relative intensities of the radiation components resulting from the interference between the undiffracted (reflected) radiation component and the first order diffraction components. It will be clear that the groove can be replaced by diffracted and undiffracted radiation components resulting from applying a radiation beam to a data track without an associated groove, the data track implemented to provide the requisite diffracted and undiffracted radiation components.

The configuration for providing tracking signals and focusing signals, as disclosed by the reference of Smid et al. and described above, suffers from the presence of a significant amount of optical cross-talk, generally originating from ever-present optical wavefront aberrations and the diffracted radiation components. Referring to FIG. 4, an experimental verification of the optical cross-talk between the tracking signal and the focusing signal is illustrated. The presence of this optical cross-talk becomes particularly important in high performance systems, such as are required in the information storage and retrieval systems, i.e., particularly systems requiring high performance servomechanism systems.

A need has therefore been felt for apparatus and an associated method for processing the radiation beam resulting from the interaction with a optical storage medium, having data tracks or grooves, and identifying therefrom the tracking signals and the focusing signals whereby the cross-talk between the two signals is minimized.

SUMMARY OF THE INVENTION

The present invention is directed to overcoming one or more of the problems set forth above. Briefly summarized, according to one aspect of the present invention, a dual prism, used in the related art to separate the positive and negative first order diffraction pattern radiation components along with the reflected (and undiffracted) radiation component, as well as the two sensor element pairs, are rotated 90° relative to the projection along the optic axis of the data track or groove being addressed by a radiation beam. The two sensor element pairs, previously used for both tracking and focusing signal generation, are now used only for focusing signal generation. The result of the rotation of the dual prism and the sensor element pairs is to include portions of both first order components in the focusing signal in such a manner as to cancel any unwanted component in the first order diffraction components. To obtain a tracking signal, a beam splitter is placed in the path of the resulting radiation and the portion of the radiation beam is applied to a separate dual element sensor, each element of the separate dual element sensor receiving a portion of the reflected radiation beam with only one of the first order diffraction components included therein.

The configuration of the present invention advantageously reduces the optical cross-talk between the tracking signal and the focusing signal thereby enhancing the high performance operation, particularly with respect to the servomechanism systems, of the head/write head required optical information and storage systems.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3A, FIG. 3B, and FIG. 3C illustrate the generation of the first order diffraction components for a radiation beam illuminating a track inn an optical storage medium along with the interference patterns resulting therefrom.

DESCRIPTION OF THE PREFERRED EMBODIMENTS

1. Detailed Description of the Drawings

FIG. 1, FIG. 2, FIG. 3A, FIG. 3B, FIG. 3C and FIG. 4 have been discussed with relation to the related art.

Figure 1:
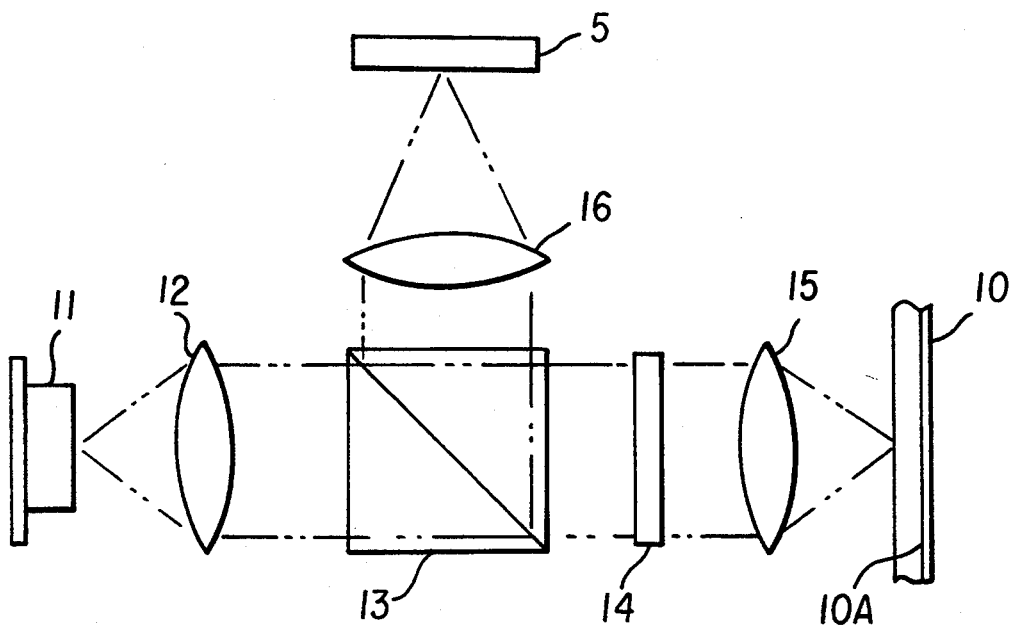
FIG. 1 is a top view of a block diagram of components for reading data from and writing data on an optical storage medium according to the related art.
Figure 2:
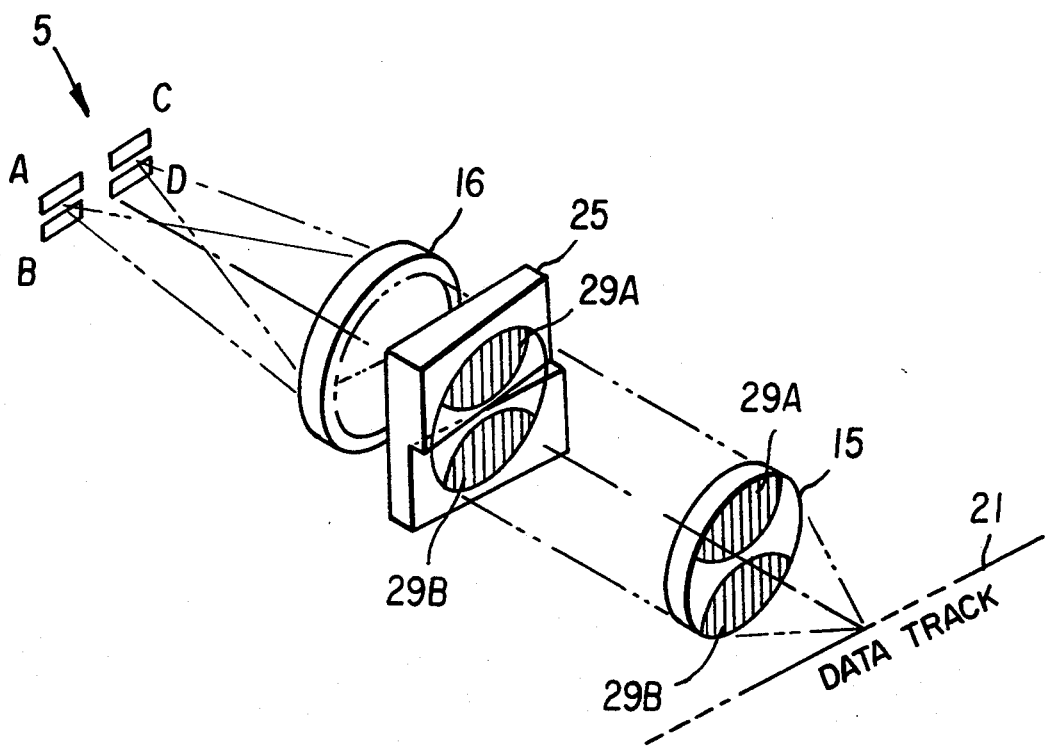
FIG. 2 is perspective view of the components processing the resulting radiation beam to provide tracking, focusing and data signals according to the related art.
Figure 4:
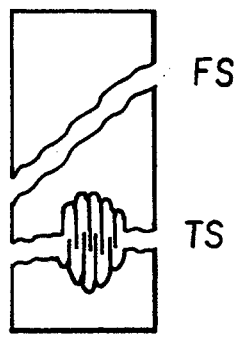
FIG. 4 illustrates an experimental verification of the presence of optical cross-talk between the tracking signal and the focusing signal.
Figure 5:
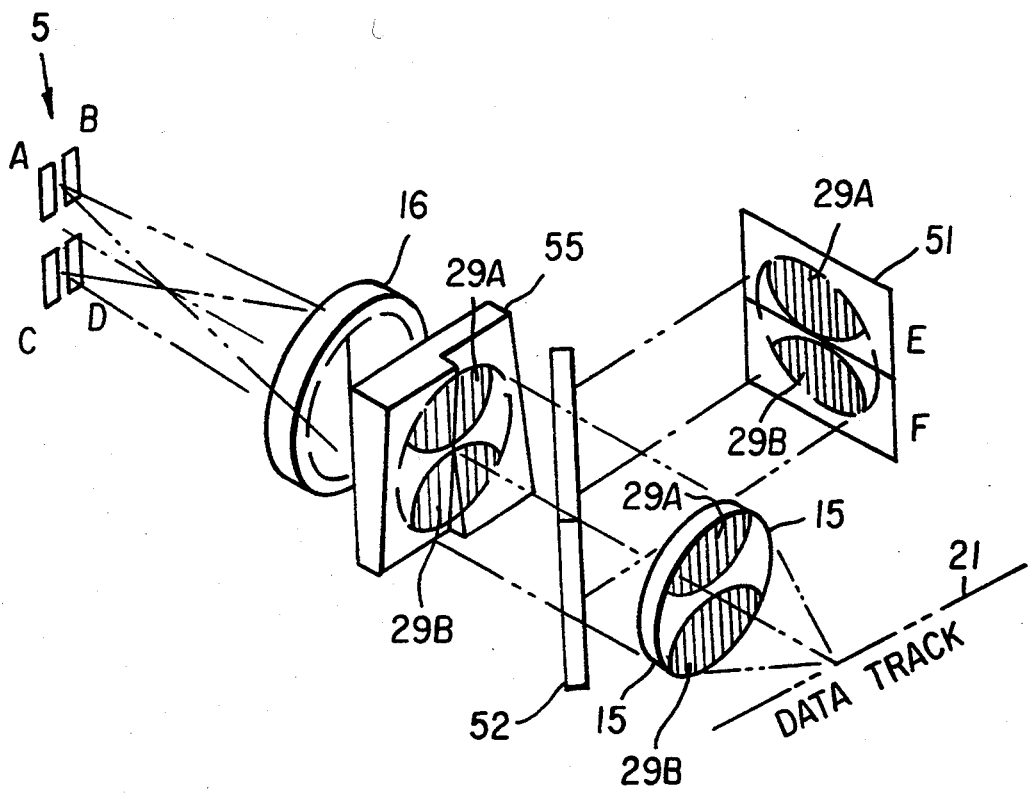
FIG. 5 is a perspective view of a block diagram of the optical components and sensor components used in generating tracking and focusing signals from the resulting radiation according to the present invention.

Referring to FIG. 5, the configuration of optical and electrical components which provide data, tracking, and focusing signals while reducing the optical cross-talk, according to the present invention, is shown. As in FIG. 2, the apparatus interacts with the resulting radiation beam, i.e., the radiation beam which has interacted with the storage medium 10. Other components such as the quarter wave plate shown in FIG. 1 have been omitted for clarity. The resulting radiation beam is re-collimated by objective lens 15. The first order diffraction components 29A and 29B are shown projected on objective lens 15. As will be clear, the reflected radiation component is also present and collimated by the objective lens 15. The collimated radiation beam is applied to beam splitter 52 where a portion of the collimated radiation beam is reflected and applied to dual element sensor 51, the dual element sensor having sensor elements E and F. Each of the sensor elements E and F have applied thereto a portion of the diffracted and reflected radiation beam, the diffracted radiation component interfering with the reflected radiation component. The portion of the radiation beam applied to each sensor element E and F includes interference radiation resulting from only one first order diffraction component. The remainder of the collimated radiation beam transmitted by beam splitter 52 is applied to dual prism 55. The dual prism 55 divides the resulting radiation component into two sensor radiation beam components. Comparing dual prism 55 with dual prism 25 of FIG. 2, the division between the elements of the dual prism 55 is rotated 90° with respect to the projection of the data track 21 on the prism. Therefore, the focusing radiation components include portions of both first order diffraction components as illustrated by the shadowing shown on the dual prism 55. Sensor focusing lens 16 focuses the radiation component from each prism element of the dual element prism 55 on one of the dual element sensors 5. The first dual element sensor has elements A and B associated therewith while the second dual element sensor has sensor elements C and D associated therewith. The disclosed configuration, as shown by inspection of FIG. 5, includes a separate path for the tracking signal and for the focusing signal. The separate paths diminish the intensity of the radiation beam at each detector element and require additional space on the read/write head. In typical optical storage systems having a read/write head, the space available for signal processing is limited.

Figure 6:
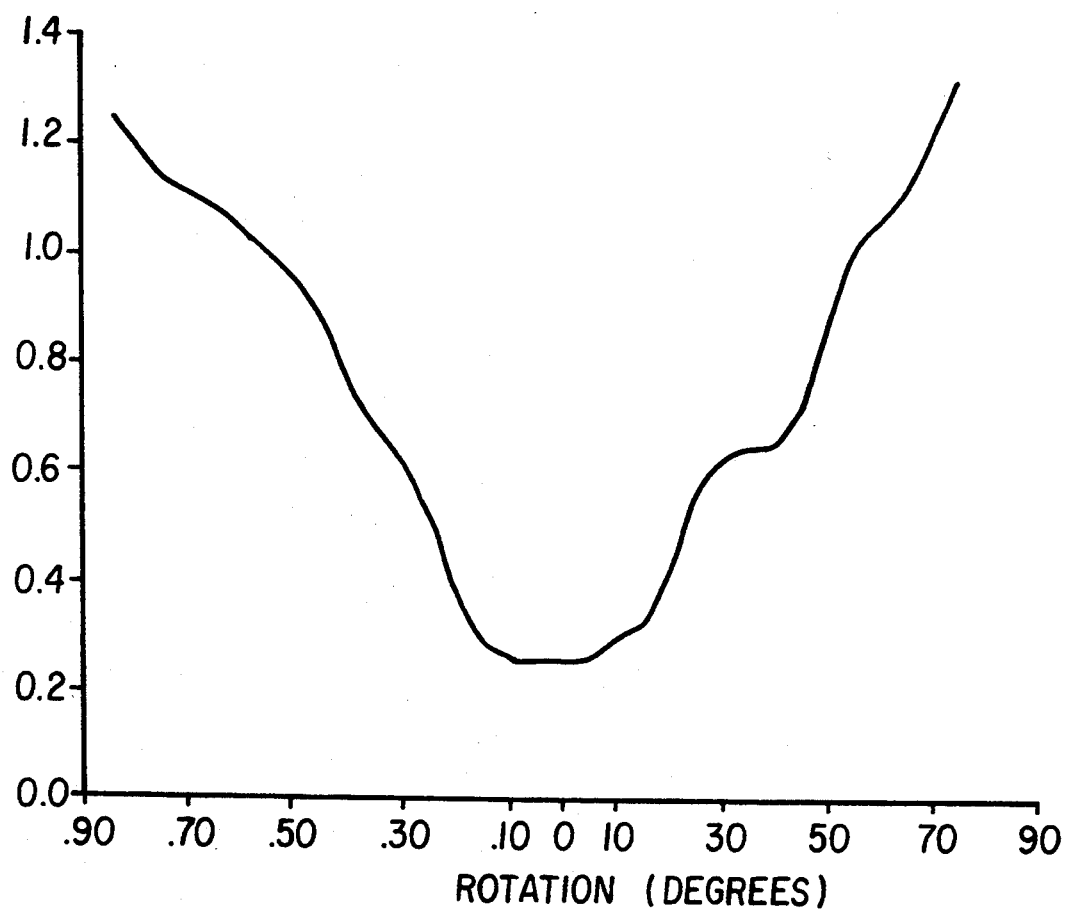
FIG. 6 illustrates the effect of rotating the dual prism from the orientation relative to a projection of the data track on the dual prism according to the present invention to the orientation of the dual prism relative to a projection of a data track as disclosed in the related art.

Referring next to FIG. 6, the result of changing the configuration of the present invention into the configuration of the related art on the cross-talk between the tracking signal and the focusing signal is shown. When the prism is in the 0° graph position, (i.e., the angle of the present invention or wherein the division between the elements of the dual prism is at an angle of approximately 90° with respect to projection of the data track on the prism), the cross-talk is at a minimum. As the prism is rotated into a position that is similar to the configuration shown in the reference of Smid et al, (i.e., having an angle of approximately 0° with respect to the projection of the data track on the prism) the cross-talk noise increases more than 5 times. This cross-talk level, for the parameters of the disk storage medium upon which the measurements were made, amounts to a focus excursion of the focus signal head of over 1 micron. As a consequence, high performance will be difficult to achieve as a result of the coupling between the focusing signal and the tracking signal.

2. Operation of the Preferred Embodiment

The configuration of the optical and sensor components of the present invention provide a decreased optical cross-talk between the tracking and the focusing signals as compared to the configuration shown in the Smid et al. reference. When the two focusing radiation beam components are generated using the dual prism, each of the focusing radiation beam components includes portions of both the first order diffraction components. The signals associated with each of the first order diffraction components is substantially canceled. In contradistinction, the difference in intensity between the interference pattern radiation derived from the interaction of the reflected and undiffracted radiation component and the two first order diffraction components is required to generate the tracking signal. The reflected radiation component is included in the radiation components applied to each element of the dual element sensor 51 used in generating the tracking signal and an interference between the radiation components takes place. Referring to FIG. 5, the focusing signal FS is given by, $$FS = (A+D) - (B+C). \quad 4.)$$

The tracking signal is given by;

$$TS = E - F. \quad 5.)$$

And the data signal is given by:

$$DS = A + B + C + D. \quad 6.)$$

or $$DS = E + F. \quad 7.)$$

or $$DS = A + B + C + D + E + F \quad 8.)$$

In the present invention, in addition to the rotation of the dual element prism and the two dual element sensors generating the focusing signal, the reduced cross-talk is achieved by the addition of a beam splitter 52 and an additional dual element sensor (51) for developing the tracking signal. The present invention requires a separate optical path for the tracking signal and for the focusing signal. Consequently, additional space and components are required to implement the invention as compared to the related art. As shown in FIG. 5, the two components of the diffraction order can be separated. However, in the preferred embodiment, these two components are selected to be as close as possible and can overlap. The relationship of the reflected radiation component and the diffraction components depends upon the groove or data track geometry.

It will be now appreciated that there has been presented a technique for reducing the optical cross-talk between the tracking and focusing signals in a read/write head of an optical information storage and retrieval system. The reduction in cross-talk has been achieved at the expense of requiring additional apparatus in the implementation.

The tracking and focusing signals generated by the apparatus of the present invention are typically referred to as a tracking error signal and a focusing error signal. This designation emphasizes that the signals are increased (+) or decreased (−) when the position of the lens is not in the optimum position. The excursions from the optimum position provide a signal which is a measure of the error between the optimum position and the actual position.

While the invention has been described with particular reference to a preferred embodiment, it will be understood by those skilled in the art that various changes may be made and equivalents may be substituted for elements of the preferred embodiment without departing from the invention. By way of specific example, the order of the optical elements can be altered without affecting the operation of the present invention. Specifically, the dual prism 55 and the sensor focusing lens 16 can be interchanged while compensating for changes in the location of the elements relative to the dual element sensors.

In addition, many modifications may be made to adapt a particular situation and material to a teaching of the invention without departing from the essential teachings of the present invention. The present invention is described with respect to a resulting radiation beam which has been reflected from the storage surface. However, the present invention can be advantageously used with radiation beams which are transmitted by the storage medium so long as diffraction order components are generated during the transmission. While the present invention has been discussed with respect to the optical storage system described with respect to FIG. 1, it will be clear that optical storage systems which rely on different phenomena for the storage of data can advantageously use the present system as long as the tracking signals, generated as a result of the differences in interference intensity between diffraction components of the same order and the undiffracted component, are present.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. Apparatus for providing tracking and focusing signals for use in controlling an application of a radiation beam to a storage medium in an optical information storage system, said apparatus responsive to radiation which has interacted with a diffraction component-creating structure in said optical storage medium, said apparatus comprising:
    a beam splitter for separating said radiation beam into a first portion and a second portion;
    a dual prism for separating said first radiation beam portion into a first radiation component from one side of a plane perpendicular to a projection of a currently irradiated track of said storage medium on said prism and into a second radiation component from a second side of said plane;
    a sensor focusing lens for focusing said first and said second radiation components;
    a first dual element sensor for detecting said first radiation component, said first dual element sensor divided by a line perpendicular to said projection of said track on said prism;
    a second dual element sensor for detecting said second radiation component, said second dual element sensor divided by a line perpendicular to said projection of said track on said prism; and
    a third dual element sensor for detecting said second portion of said radiation beam, said third dual element sensor positioned relative to said beam splitter and said currently irradiated track of said storage medium, wherein each element of said third dual element sensor receives radiation from one side of a plane parallel to said projection of said track on said prism.

2. The apparatus of claim 1 wherein said third dual element sensor provides a tracking signal.

3. The apparatus of claim 2 wherein said first and said second dual element sensors provide a focusing signal.

4. The apparatus of claim 3 wherein each dual element sensor pair receives said radiation beam having both orders of a diffraction component.

5. The apparatus of claim 2 wherein each sensor element of said sensor element pair receives said radiation beam which includes a different diffraction component having the same diffraction order.

6. A method of providing tracking and focusing signals for radiation which has interacted with a diffraction pattern-creating optical storage medium, said tracking and focusing signals controlling a position of a radiation beam interacting with said optical storage medium, said method comprising the steps of:
    dividing said radiation beam into a first portion and a second portion;
    applying said first radiation beam portion to a prism for separating said first radiation beam portion into a first radiation beam component and a second radiation beam component, a separation of said first and said second radiation beam components determined by a plane perpendicular to a projection of a currently illuminated data track of said storage medium on said prism;
    focusing said first radiation beam component on a first dual element sensor and focusing said second radiation beam component on a second dual element sensor, said first and said second dual element sensors divided by a line perpendicular to said projection of said currently illuminated data track on said prism; and
    applying said second radiation beam portion to a third dual element sensor, said third dual element sensor divided by a line parallel to said projection of said currently illuminated data track on said prism.

7. The method of claim 6 further comprising a step of combining output signals of said first and said second dual element sensors to provide said focusing signal.

8. The method of claim 6 further including the step of combining output signals from said third dual sensor pair to provide said tracking signal.

9. The method of claim 6 wherein said step of applying said second radiation beam portion includes a step of applying an undiffracted component combined with a first component of a given diffraction order to a first sensor element of said third dual element sensor and applying an undiffracted component combined with a second component of said given diffraction order to a second sensor element of said third dual element sensor.

10. The method of claim 6 wherein said step of applying said first radiation beam portion to said prism includes a step of providing both said first radiation component and said second radiation component with both diffraction components of a given diffraction order and an undiffracted radiation component.

11. Apparatus for providing a tracking signal and a focusing signal for a radiation beam of an optical information storage system being applied to a data track, said apparatus comprising:
dividing means for dividing said radiation beam into a first radiation beam portion and a second radiation beam portion;
separating means for separating said first radiation beam portion into a first radiation beam component and a second radiation beam component, wherein said first and said second radiation beam components are separated by a plane perpendicular to a projection of a currently accessed data track of said storage medium on said separating means;
a first dual element sensor, a second dual element sensor, and a third dual element sensor, said third dual element sensor separated along a line parallel to said projection of said currently accessed data track on said separating means, wherein said second radiation beam portion is applied to said third dual element sensor; and
focusing means for focusing said first radiation beam component on said first dual element sensor and focusing said second radiation beam component on said second dual element sensor.

12. The apparatus of claim 11 wherein said first dual sensor has sensor elements A and B, wherein said second dual sensor has elements C and D, said first and second dual sensor elements providing said focusing signal according to the relationship $\{(A+D)-(B+C)\}$.

13. The apparatus of claim 12 wherein said first and second dual sensor elements all receive both components of a selected diffraction.

14. The apparatus of claim 11 wherein said third dual sensor includes sensor elements E and F, said third dual sensor elements providing said tracking signal according to a relationship (E-F).

15. The apparatus of claim 14 wherein said sensor element E receives a first component of a selected diffraction order combined with an undiffracted radiation component and said sensor element F receives a second component of a selected diffraction order combined with an undiffracted radiation component.

16. The apparatus of claim 11 wherein illumination by said radiation beam of said data track provides positive and negative components of first order diffraction radiation, said positive and negative components having intensities determined by a location of said radiation beam relative to said data track.

17. The apparatus of claim 16 wherein said data track is defined by a groove in said storage medium.

18. The apparatus of claim 17 wherein said data track is defined by a path of regions.

19. The apparatus of claim 16 wherein said data track is defined by a region between grooves in said storage medium.

20. The apparatus of claim 11 wherein said first and said second dual element sensors are separated by a line parallel to said plane of separation of said first and said second radiation beam components.

* * * * *